United States Patent [19]

Wirtz et al.

[11] Patent Number: 5,301,887
[45] Date of Patent: Apr. 12, 1994

[54] MEANS FOR CONTROLLING THE TRAVEL OF A YARN IN A TEXTILE MACHINE

[75] Inventors: Ulrich Wirtz; Andreas Kruger, both of Monchen-Gladbach, Fed. Rep. of Germany

[73] Assignee: W. Schlafhorst AG & Co., Monchen-Gladbach, Fed. Rep. of Germany

[21] Appl. No.: 769,178

[22] Filed: Sep. 30, 1991

[30] Foreign Application Priority Data

Sep. 29, 1990 [DE] Fed. Rep. of Germany ....... 4030892

[51] Int. Cl.$^5$ ...................... B65H 59/00; B65H 63/00
[52] U.S. Cl. ........................ 242/36; 242/45; 242/149
[58] Field of Search ............. 242/36, 45, 35.5 R, 242/149, 150 R, 150 M; 226/45, 24, 10, 11; 57/80, 81, 93; 73/160; 374/141

[56] References Cited

U.S. PATENT DOCUMENTS 3,756,524  9/1973  Felix ........................... 242/36
5,074,481  12/1991  Kathke ........................ 242/36

FOREIGN PATENT DOCUMENTS 0237892   9/1987  European Pat. Off. .
3733597   4/1989  Fed. Rep. of Germany .
3811294  10/1989  Fed. Rep. of Germany .
521916    6/1972  Switzerland .

Primary Examiner—Stanley N. Gilreath
Attorney, Agent, or Firm—Shefte, Pinckney & Sawyer

[57] ABSTRACT

A heat sensor which detects the heat generated from sliding frictional contact with a traveling yarn in a textile machine and generates control signals therefrom for the controlling of a yarn winding operation. A temperature-sensitive electric resistor, especially a thin-layer resistor or a film thermometer, serves as the heat sensor. The heat sensor is connected e.g. via a signal converter to control devices, e.g. to a controllable yarn brake and/or to a drive motor for yarn take-up. When the measured temperature rises above a limit value, the braking force of the yarn brake can be first lowered and then the speed of the drive motor can be reduced.

42 Claims, 6 Drawing Sheets

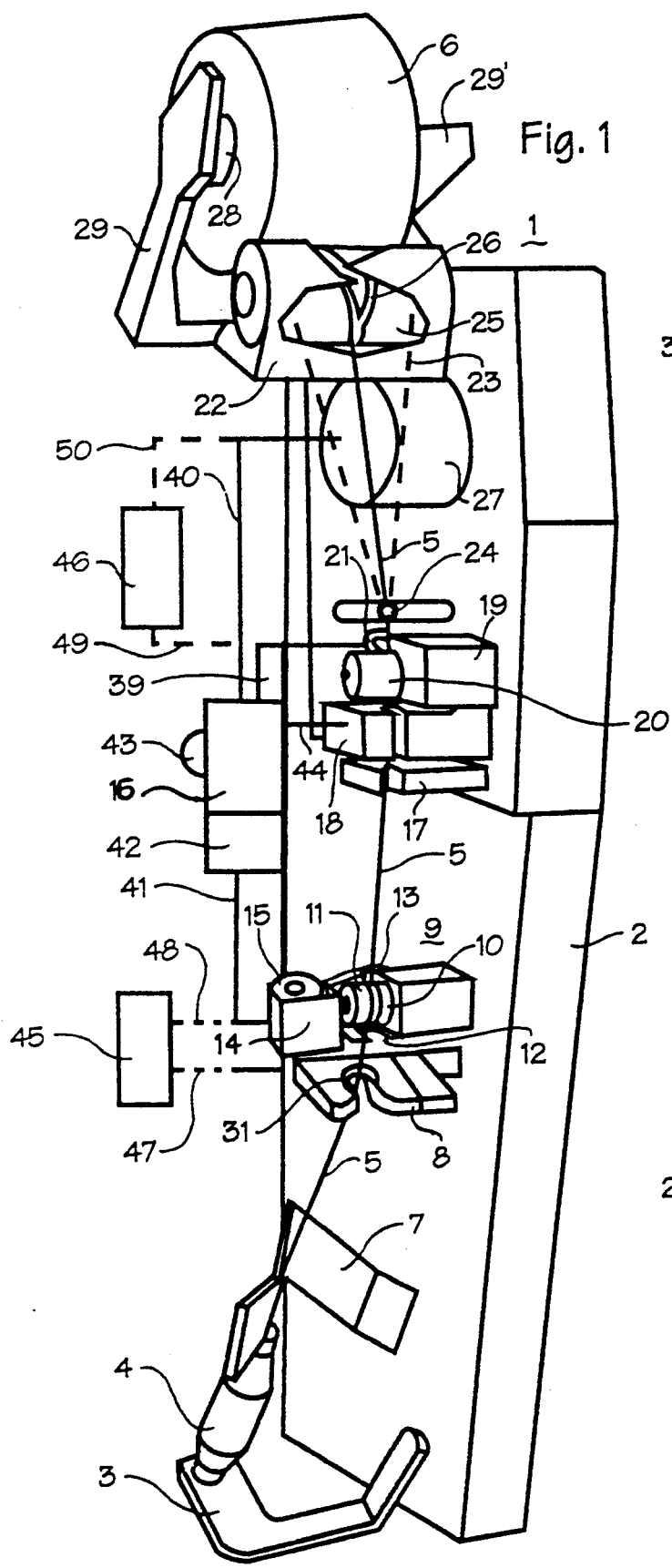
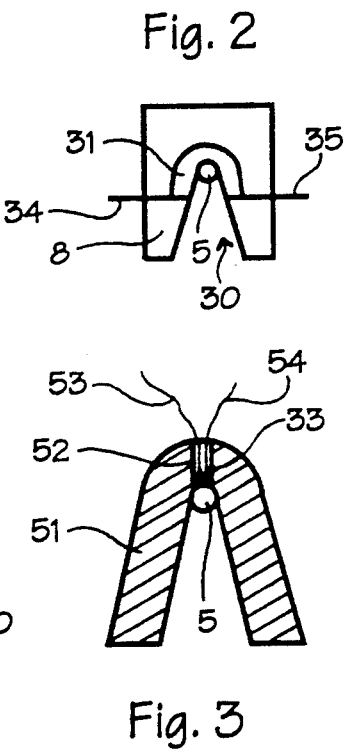
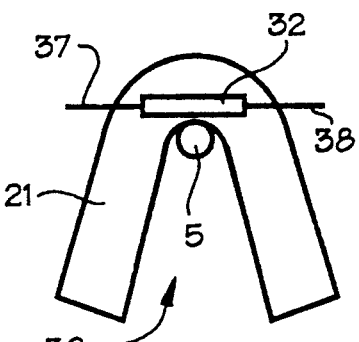
Fig. 1
Fig. 2
Fig. 3
Fig. 4

MEANS FOR CONTROLLING THE TRAVEL OF A YARN IN A TEXTILE MACHINE

FIELD OF THE INVENTION

The present invention relates to controlling yarn travel in a textile machine, and, more particularly to controlling operating conditions in response to conditions in the traveling yarn.

BACKGROUND OF THE INVENTION

In producing, processing or otherwise handling strands of traveling yarn in textile machines of various types, the quality of the yarn or yarn product produced by the textile machine depends to a considerable extent o maintaining the traveling yarn at a constant tension so that the product, be it a bobbin or package of yarn or a fabric or other yarn product, is of uniform high quality. The quality of the ultimate woven or knitted fabric is directly related to the consistency of quality of the yarn used in manufacturing the product and the consistency of the yarn is directly related to the uniformity of the tension in the yarn as it is wound into a bobbin or package by a yarn preparatory machine and from which the yarn is unwound in further processing to ultimately produce a fabric. For example, the quality of textile packages produced on textile winders depends o winding the yarn at a constant tension so that the yarn will unwind uniformly and at a constant tension when the package is used in the next stage of manufacturing. Moreover, efficiency and productivity of textile machines dictates that the machines operate at the highest speeds possible compatible with acceptable quality. To this end, the more accurately the tension in a traveling yarn can be maintained uniform at high speeds, the faster the machines can be run with resulting enhanced productivity and efficiency. For example, in textile winders variations in yarn tension can result in undesirable yarn breaks that obviously occur more frequently at high speeds where the time to adjust for tension variations to avoid breaks is extremely short.

Detecting the tension of a traveling yarn and responding to tension variations to adjust conditions to return the tension to the desired uniform tension is difficult to accomplish with conventional techniques, particularly at high speeds. In contrast, the present invention provides means for detecting yarn tension variations spontaneously and means for substantially immediate control response. This is accomplished in the present invention by detecting and responding to the heat created by characteristics of the traveling yarn.

SUMMARY OF THE INVENTION

It is an object of the present invention to provide instantaneous readings of yarn tension in a textile machine.

It is yet another object of the present invention to provide for effective control of yarn tension in a textile machine.

These and other objects of the present invention are provided in a device for controlling the travel of a yarn in a textile machine having at least one heat sensor placed in proximity to the yarn for sensing heat generated by at least one tension related characteristic of the traveling yarn. The device is also responsive to the heat sensing by the at least one heat sensor and controls travel of the traveling yarn in relation to the heat sensed.

Preferably, the tension related characteristics include the pressure force, friction value and the speed of the traveling yarn. During operation of the device, the at least one heat sensor preferably senses friction temperature, change over time of friction temperature, frictional energy, and/or heat flow. The heat sensor may be an electric resistor.

The at least one heat sensor should be preferably disposed for sliding friction contact with the traveling yarn.

The device may further include an electric insulator on which the at least one heat sensor is mounted. The electric insulator has a metallized surface and a metallic cooling element disposed at a sensing site. The metallic cooling element contacts the metallized surface.

The device may also comprise a signal converter which is connected to the at least one heat sensor and the control device. The control device may be a controllable drive motor for a yarn receiving bobbin and/or a controllable yarn break.

The signal converter preferably includes a control circuit for controlling the yarn brake in correspondence with rising heat sensed and for controlling of said drive motor with a reduction in the braking action of the yarn brake. The signal converter may be formed of an electronic amplifier circuit and/or a bridge circuit as well as a temperature compensation sensor.

The device preferably may further include a computer performing some of the signal converter's functions. The signal converter may preferably comprise a temperature offset circuit which sets a temperature zero point, upon the start of each yarn travel operation after a yarn break and/or the end of a supply of yarn to the machine.

The device may preferably have at least one second heat sensor connected to the at least one sensor and which senses an ambient temperature, ambient temperature change over time, and/or heat flow from the at least one sensor to the second heat sensor. Here, the control means converts the sensed parameter to one or more control signals for operation of the textile machine. The at least one first heat sensor may be disposed on the side of the at least one second sensor spaced from the heat sensing proximity. The first and second sensors may be placed for sliding friction contact with the yarn.

The signal converter preferably includes components for modulation of signals from the at least one heat sensor. The components for modulation are operable to modulate frictional temperature, temperature difference between the at least one first and second heat sensors, and/or heat flow and the control means provides at least one control signal from the modulated signal. The control signal controls the operation of a drive motor for causing the yarn to travel in the machine and/or a yarn brake and the signal converter, and/or the computer provides the control signal.

The signal converter and/or the computer are programmed to form a quotient between the temperature difference and the yarn speed generated by the drive motor and maintain the quotient constant by controlling the drive motor and/or the yarn brake.

In winder machine embodiments, the first and second heat sensors and a signal converter may be disposed proximate to a winding position, an unwinding position, and/or a yarn guide position. Here, the signal converter is connected to a computer connected to a selected control and/or a regulating device.

Further features and advantages of the present invention will be apparent from the drawings and the following detailed description of the preferred embodiment.

BRIEF DESCRIPTION OF THE DRAWINGS

FIG. 1 is a perspective view of a winding unit of a textile winder incorporating the preferred embodiment of the means for controlling the travel of a yarn of the present invention;

FIG. 2 is a plan view of the heat sensor in the machine of FIG. 1;

FIG. 3 is a horizontal sectional view of an alternate heat sensor;

FIG. 4 is a plan view of another alternate heat sensor;

DETAILED DESCRIPTION OF THE PREFERRED EMBODIMENT

Figure 6:
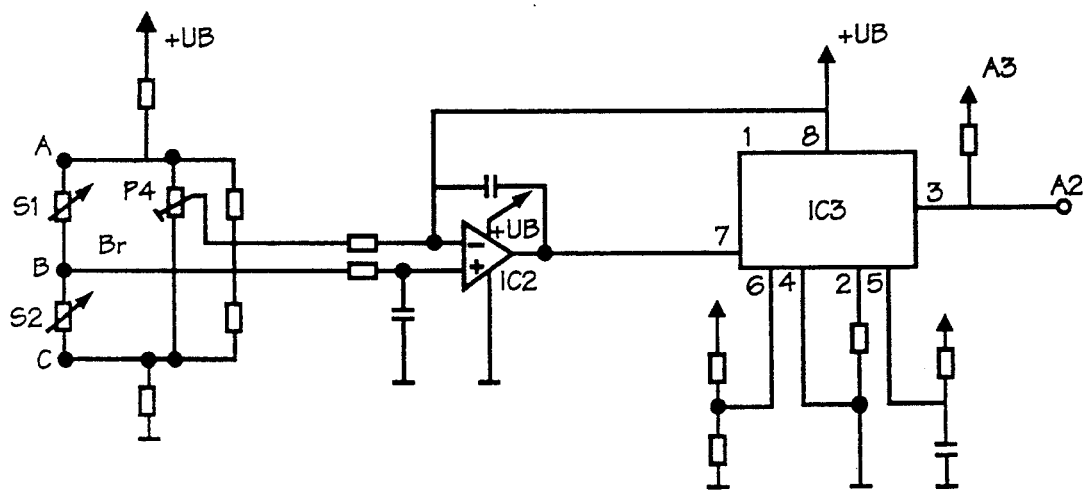
FIGS. 5 and 6 are electrical circuit diagrams of signal converters useable in the control means of the preferred embodiment of the present invention.

In one embodiment of the invention, at least one heat sensor is designed to detect the friction temperature and/or to detect the change over time of the friction temperature or frictional energy and/or of the heat flow. The heat sensor is preferably designed as a temperature-sensitive electric resistor, preferably as a thin-layer resistor or as a film thermometer. In a thin-layer resistor or film thermometer, the time constant or response inertia is small.

In still another embodiment of the present invention, an electric insulator carrying the heat sensor comprises a metallized surface which is brought at the sensing site into contact with a metallic cooling element. The cooling element can consist e.g. of a copper plate or of parts of the machine frame. These senses assure a rapid cooling off of the heat sensor after the cessation of the yarn motion. This means e.g. that a yarn break can be recognized more rapidly.

The heat sensor is located in another embodiment of the invention on a yarn guide element which is located between a yarn delivery bobbin and a yarn tensioner located in the yarn path. The heat sensor would react in this instance without delay to elevations of temperature which result upstream from the yarn temperature from the unwinding behavior of the yarn from the yarn delivery bobbin.

As another alternative, seen in FIGS. 1 and 4, the heat sensor 32 may be located in a yarn guide element which is located in the yarn traversing triangle or at the foot point of a yarn traversing triangle. Heat sensor 32 may transmit its sensed signals via connection leads 37 and 38. The temperature elevations resulting from the winding behavior of the yarn onto a cross-wound bobbin to which the yarn is supplied in a traversing manner can be sensed.

In a further embodiment of the present invention, at least one control device for controlling the path of the yarn is provided. The heat sensor is connected via a signal converter 16 to the control device and the yarn path is controlled according to the signals of the heat sensor. The signal converter 16 may comprise any kind of converting of sensor signals into control signals for the control device. For example, as the sensed temperature rises, the yarn travel speed can be reduced linearly or in accordance with a set curve and the binding operation can be controlled therewith. If the sensed temperature drops again thereupon, the yarn travel speed can be raised back up again either in a linear fashion or according to the same or another curve. An oscillating raising and lowering of the yarn travel speed may also be advantageous. Additionally, the winding operation or yarn path can be controlled with different braking forces exerted on the yarn by means of a controllable yarn brake.

According to FIG. 1, creel 2 of a bobbin winder 1 carries the following parts, which are significant in conjunction with the present invention:

A yarn delivery bobbin 4 is inserted onto an unwinding device 3 from which bobbin yarn 5 is unwound. On the way to yarn receiving bobbin 6, yarn 5 first passes through a balloon breaker 7, then a yarn guide element 8 and then a controllable yarn brake 9. Yarn break 9 comprises two brake plates 10,11 as well as two yarn guides 12,13. Yarn 5 runs through yarn guide 12, then goes between brake plates 10,11 and thereafter passes through yarn guide 13. Brake plate 11 is connected to braking force controlling device 14, with the aid of which brake plate 11 can be placed against brake plate 10 and yarn 5 located therebetween with a force which can be preadjusted by knurled-head screw 15 and/or controlled by signal converter 16.

Upstream from yarn brake 9, yarn 5 runs through electronic clearer 17, cutting and clamping device 18 and paraffining device 19.

Paraffining device 19 is set up so that it slowly rotates paraffin roller 20 and that yarn 5 touches the front side of paraffin roller 20.

Yarn 5 runs through another yarn guide element 21 above paraffining device 19, which element forms the foot point of a yarn traversing triangle. The yarn traversing triangle is indicated by dotted lines 22,23.

From yarn guide element 21, yarn 5 runs past yarn catch nozzle 24 to yarn guide drum 25. Yarn guide drum 25 is provided with reversing threaded groove 26 for a traversing placing of the yarn. It is driven by controllable drive motor 27.

Tube 28 of yarn receiving bobbin 6 designed as a cross-wound bobbin is clamped in a rotatable manner in pivotable bobbin creel 29,29'. Yarn receiving bobbin 6 rests on yarn guide drum 25. It is driven by friction directly by yarn guide drum 25 and indirectly by drive motor 27.

Yarn guide element 8 is shown on another scale in a view from the top in FIG. 2. Yarn guide element 8 consists of ceramic material comprising V-shaped slot 30 for yarn guidance. Yarn 5 runs over the bottom of the slot. Yarn guide element 8 is provided on the top in the vicinity of slot 30 with heat sensor 31. As mentioned, preferably heat sensor 31 may consist of a temperature-sensitive, electric thin-layer resistor whose connection leads are designated by 34 and 35. The thin layer is only a few angstroms thick and consists of platinum or nickel. The resistance of the thin layer of platinum varies linearly with the temperature in the range between 0° and 100° C. The thin layer may be applied onto ceramic yarn guide element 8 functioning here as a carrier by means of vaporization in a vacuum and was then connected to the carrier by being burned in (annealed) at approximately 800° C.

The thin layer is preferably coated with a mechanically resistant protective layer which may be aluminum oxide. However, the thin layer can also remain without protective layer or without protection against wear if the yarn does not run directly over the thin layer.

Yarn guide element 21 is shown on another scale in a top view in FIG. 4. It also consists of ceramic material and comprises V-shaped slot 36, in the bottom of which yarn 5 runs. A temperature-sensitive electric resistor is adhered by a ceramic adhesive to the surface of yarn guide element 21 in the vicinity of running yarn 5 as heat sensor 32. The connection leads of heat sensor 32 are designated by 37 and 38.

According to FIG. 1, heat sensor 32 is connected by cable 39 to signal converter 16. Signal converter 16 is connected by other cables 40, 41 to two control devices, namely to drive motor 27 and braking force control device 14 of yarn brake 9. Signal converter 16 comprises a control circuit 42 which functions to control yarn brake 9 with increasing development of heat at the yarn travel point of yarn guide element 2. Yarn brake 9 is adjusted with rising temperature in the direction of a reduction of the braking action by its braking force control device 14. Signal converter 16 does not cause drive motor 27 to be controlled in the direction of a reduction of speed until there is a subsiding or ceasing braking action of yarn brake 9.

As the temperature rises to the sensing point, at first the yarn tension and then the support pressure of the yarn on the friction opposing member are reduced by returning the yarn brake. This has priority because the winding speed in this instance can remain as high as possible for as long as possible. The yarn travel speed is not reduced until other control possibilities have been exhausted.

A temperature limit is set for signal converter 16. When this limit is exceeded, the signal converter 16 activates disturbance indicator 43 and actuates cutting and clamping device 18 via cable 44. If, accordingly, the temperature becomes too high on yarn guide element 21 for any reason, signal converter 16 automatically deactivates the bobbin drive 27 and brings about the separation of the yarn and the retention of the bottom yarn [underyarn] on cutting and clamping device 18.

Disturbance indicator 43 could also be coupled to a fire extinguishing device which could automatically become active in the case of an extraordinary exceeding of the temperature limit.

Figure 16:
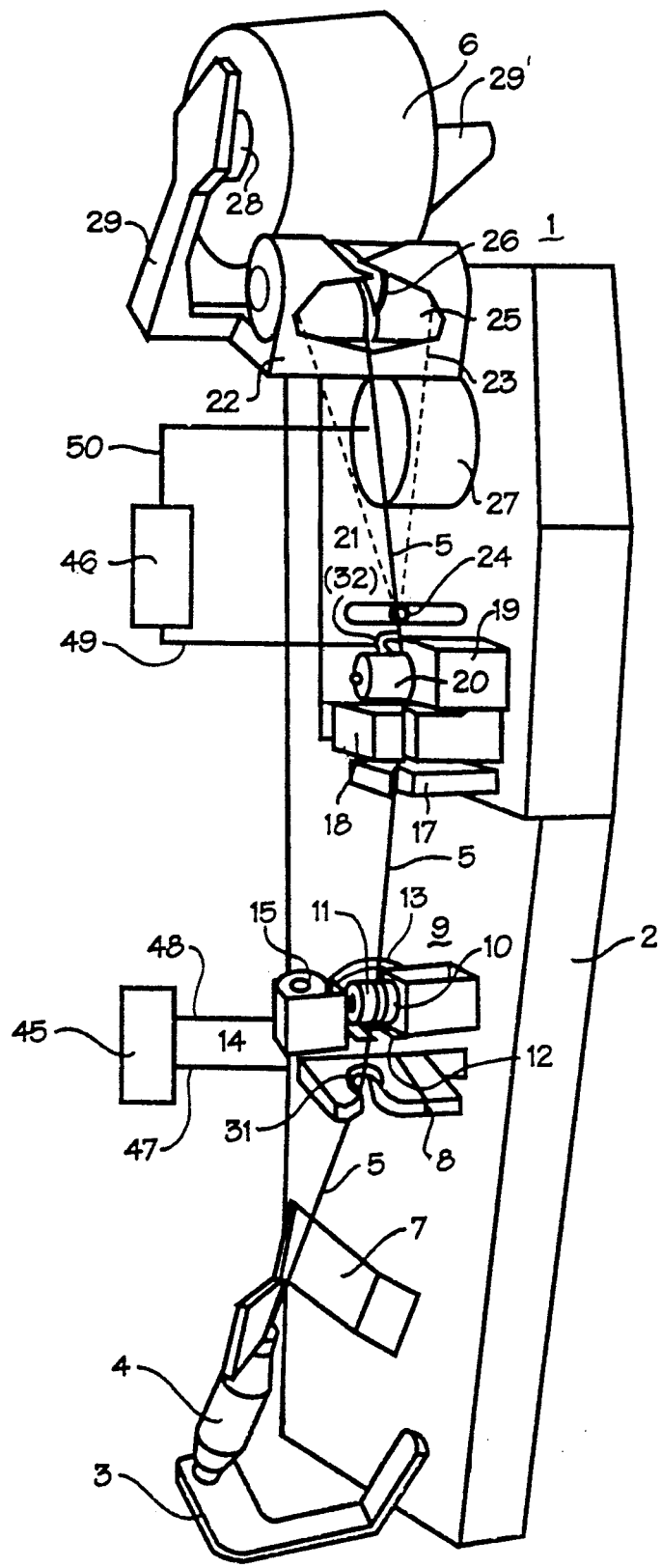
FIG. 16 is a perspective view of a winding unit of a textile winder incorporating an alternative embodiment of the means for controlling the travel of a yarn of the present invention.

FIG. 16 shows an alternative to the invention:
Instead of the one signal converter 16, e.g. two signal converters 45, 46 could also be present. Signal converter 45 would be connected by cables 47, 48 to heat sensor 31 and to brake force control device 14 and signal converter 46 by cables 49, 50 to heat sensor 32 and motor 27.

The two signal converters 45, 46 may operate autonomously. Signal converter 45 may control yarn brake 9 and signal converter 46 may autonomously control the bobbin drive 27. The cutting and clamping device 18 is not controlled by the signal converters 45, 46 in this embodiment but, rather, is regulated by the electronic cleaner 17 as is conventional.

FIG. 3 illustrates an alternative design in longitudinal section. A yarn guide element 51 for yarn 5 consisting of ceramic material comprises a bore 52 on the side facing away from yarn 5 which bore is so deep that only a little material is present at the position contacted by the yarn between a heat sensor 33 inserted into bore 52 and running yarn 5. The transfer of heat onto heat sensor 33 takes place through the thin layer of ceramic material. Heat sensor 33 could also consist of platinum. The connection leads for heat sensor 33 are designated by 53 and 54.

Figure 5:
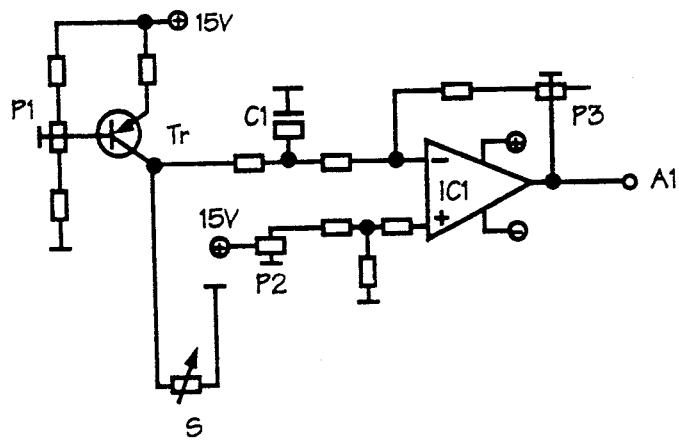

In the circuit according to FIG. 5 suitable for a signal converter, the voltage at the base of transistor Tr is adjusted to e.g. one volt in potentiometer P1. This renders the transistor conductive and a current flows from terminal plus 15 V via a resistor R1 to the emitter and the collector of the transistor and heat sensor S to ground. Heat sensor S operates in the resistance range of 30 to 100 ohms. Operational amplifier IC1 connected as a stable multivibrator is connected to the collector of transistor Tr. The electric voltage appearing on its output A1 is dependent, among other things, on the particular resistance of heat sensor S and the heat sensor's resistance which is dependent on the particular sensed temperature. The amplification factor of IC1 can be adjusted on potentiometer P3, for example, 100. If a zero point adjustment occurs on the non-inverted input of the IC1 with potentiometer P2, a difference voltage appears at A1 which relates to the heating of heat sensor S caused by the running yarn. This voltage difference is sufficient for a suitable sensing signal. However, it can be converted, as will be explained in the following, with a known circuit into a suitable frequency signal. Filter capacitor C; is dimensioned so that it filters out all frequencies above 20 hertz, that is, all disturbance frequencies. Its capacity is e.g. 10 microfarads. A temperature compensation circuit may also be included in this type signal converter.

In the circuit according to FIG. 6, which is also suitable for a signal converter, heat sensor S1 is placed into bridge circuit Br with its connections A and B together with temperature compensation sensor S2 with its connections B and C. The temperature compensation sensor S2 may be of the same type as the heat sensor. The compensation sensor is preferably located outside of the direct range of influence of the frictional heat generated by the running yarn. With its aid, the influence of the ambient temperature on the measured result is compensated in a known manner. The bridge voltage is taken at B and along with the voltage of potentiometer P4 and supplied via resistors of approximately 10 kiloohms, for example, to operational amplifier IC2. The bridge's output leads to integrated circuit IC3 whose internal circuitry allows for connection in a conventional manner as a voltage-to-frequency converter. The voltage-to-frequency converter which converts the temperature signals into frequency signals which are preferably in a frequency range of 25 to 35 hertz relative to the temperature zero point. Temperature elevations may become noticeable by means of frequency elevations which are located with advantage in a range of delta f = zero to 20 hertz. A difference frequency appears again on its output A2 upon a suitable zero balance which frequency is between 0 hertz and a maximum of 20 hertz in normal winding operation.

For example, the linear integrated switching circuit OPφ7 can be used as IC2 and integrated linear switching circuit LM331 as IC3. Additionally, a frequency-sensitive relay contained in control circuit 42 according to FIG. 1 can be placed on output A1 of the circuit according to FIG. 5 or on output A2 of the circuit according to FIG. 6 which relay brings about, e.g. upon reaching a difference frequency of 8 to 10 hertz, either the control of yarn brake 9 or the control of drive motor 27 for maintaining this frequency constant. As a result thereof, the heating of the running yarn is again limited and its tension or running speed correspondingly reduced.

In yet another aspect of the present invention, the signal converter 16 may comprise a temperature offset circuit with the possibility of setting a new temperature zero point upon the start of the winding process after a yarn break or after a yarn delivery bobbin has become empty.

Since the yarn tensile force is proportional to the quotient of the temperature difference and of the yarn speed, it is necessary in the case of changes of the yarn speed to eliminate its influence on the tensile force. In this instance, not only the temperature difference in the determination of heat flow but rather the named quotient should be maintained constant. As a result thereof, the yarn tractive force is maintained constant even in the case of a lowering of the yarn speed. However, such measures are only necessary if a very precise regulating is desired.

If the speed is to be lowered at the cop end, the quotient delta T/v (temperature/velocity) must accordingly be constant in this phase. Alternatively, in the case of progressively [step-by-step] changed speed, a correction of the theoretical temperature value delta T can also be performed. This change involves only conventional program rules for the computer which are to be selectively used.

Figure 7:
FIGS. 7 through 10 are sensor variations in elevation and plan views.
Figure 8:
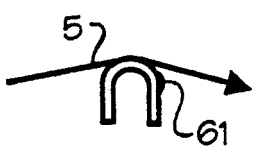
Figure 9:

FIGS. 7,8 and 9 illustrate yarn guide elements 55,56,57 which are particularly suited for use in the traversing triangle. The yarn 5 running in the direction of the arrow traverses transversely in the direction of the arrow and is thus in constant contact with the yarn guide element.

In the design of FIG. 7, heat sensor 60 is set parallel to the direction of yarn travel into the surface of yarn guide element 55, which is designed in a cup shape. At each traversing of yarn 5, the heat sensor 60 is passed over twice by the running yarn. A heat signal is produced each time thereby. If the heat signal is lacking, the yarn is no longer traversing, so that heat sensor 60 activates a disturbance signal. Either the yarn is standing still or it is no longer present or a drum winding is forming on yarn guide drum 25 (FIG. 1).

In the design of FIG. 8, heat sensor 61 is attached transversely to the direction of yarn travel on yarn guide element 56 in such a manner that it is not contacted by the running yarn.

The design of FIG. 9 differs from the design of FIG. 8 in that heat sensor 62 is located on the inside of cup-shaped yarn guide element 57.

Figure 10:
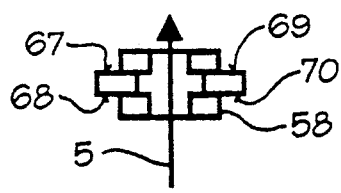

In the design of FIG. 10, yarn 5 runs in the direction of the arrow in notch 65 of yarn guide element 58. Yarn guide element 58 consists of an electric insulator with good heat conductivity, e.g. sintered ceramics. Yarn guide element 58 is provided on each side of notch 65 with two metallized surfaces 67,68 and 69,70 which are parallel to each other. Heat sensor 63 is vaporized parallel to the direction of yarn travel onto polished, level surface 71, which is located on the back side of yarn guide element 58. The distance of the heat sensor 63 from the running yarn 5 is very small. The vaporizing of a heat sensor onto a polished surface on an insulator is advantageous as it results in a constant and reproducible temperature/resistance ratio of the sensor.

Figure 12:
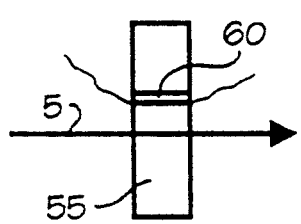
FIG. 12 is an elevational view of the housing of FIG. 11.
Figure 12:
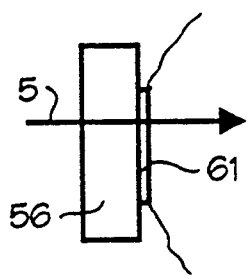
Figure 12:
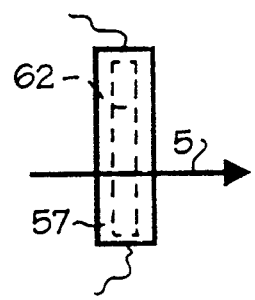
Figure 12:
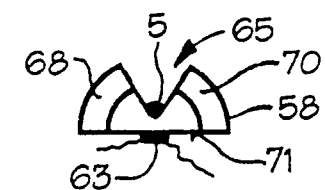
Figure 12:
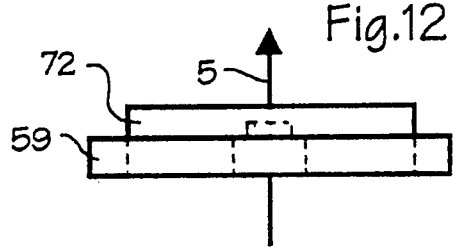
Figure 11:
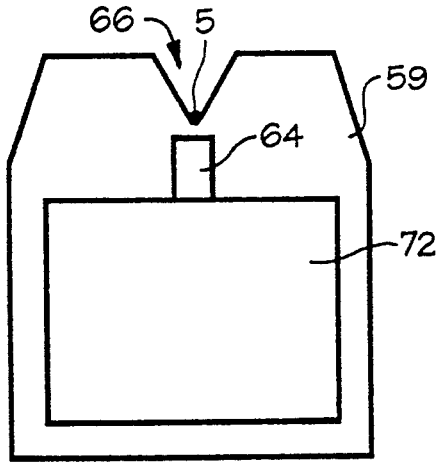
FIG. 11 is a plan view of a housing containing a signal converter in proximity to a yarn travel path.

In the design of FIGS. 11 and 12, yarn guide element 59 consists of a level plate of wear-resistant ceramics in whose notch 66 yarn 5 runs in the direction of the arrow. Essential circuit elements of signal converter 16, e.g. the circuit elements shown in FIG. 5 or FIG. 6, may be cast in common with heat sensor 64 into embedding 72 or cast without heat sensor 64. The embedding which consists of a material which is a good heat conductor but is not electrically conductive (i.e., a ceramic). Embedding 72 is adhered with a ceramic adhesive onto yarn guide element 59 in such a manner that heat sensor 64 is located close to the yarn path, as FIG. 11 illustrates. The advantage of such an arrangement resides in the fact that possible disturbing influences ar reduced via sensor supply leads. The electronic amplifier circuit can, for example, be applied in a hybrid technique onto a carrier plate of this compact unit. The embedding or housing can be designed at the same time as a yarn guide element which is attached to the bobbin winder at a suitable position, e.g. by means of secure clamping. This can considerably increase the disturbance reliability of the measuring device.

The design forms and variants of the invention also yield friction temperature signals which can still be evaluated even if the yarn looping on a yarn guide element is nearly 0°. It is especially advantageous that the sensed curves display a signal which is not very noisy, so that an expensive filtering in the signal evaluation can be eliminated. External disturbing influences due to oscillations, atmospheric moisture or air currents become practically unnoticeable. The qualitative path of the friction temperature, entered over the time and sensed between the sensor and running yarn, is very similar to the path of the yarn tractive force if a spinning cop is used as yarn delivery bobbin 4.

During the starting of the bobbin winder the friction temperature is proportional to the starting bobbin winding speed. As the speed becomes greater, more frictional heat is also given off onto the sensor. A temperature equilibrium between induced heat and heat energy given off into the environment does not develop until a constant yarn running speed is reached. It is advantageous to bring the temperature-sensitive resistor as close as possible to the yarn path and at the same time to assure a good heat transfer between resistor and substrate as well as between substrate and the environment.

Figure 13:
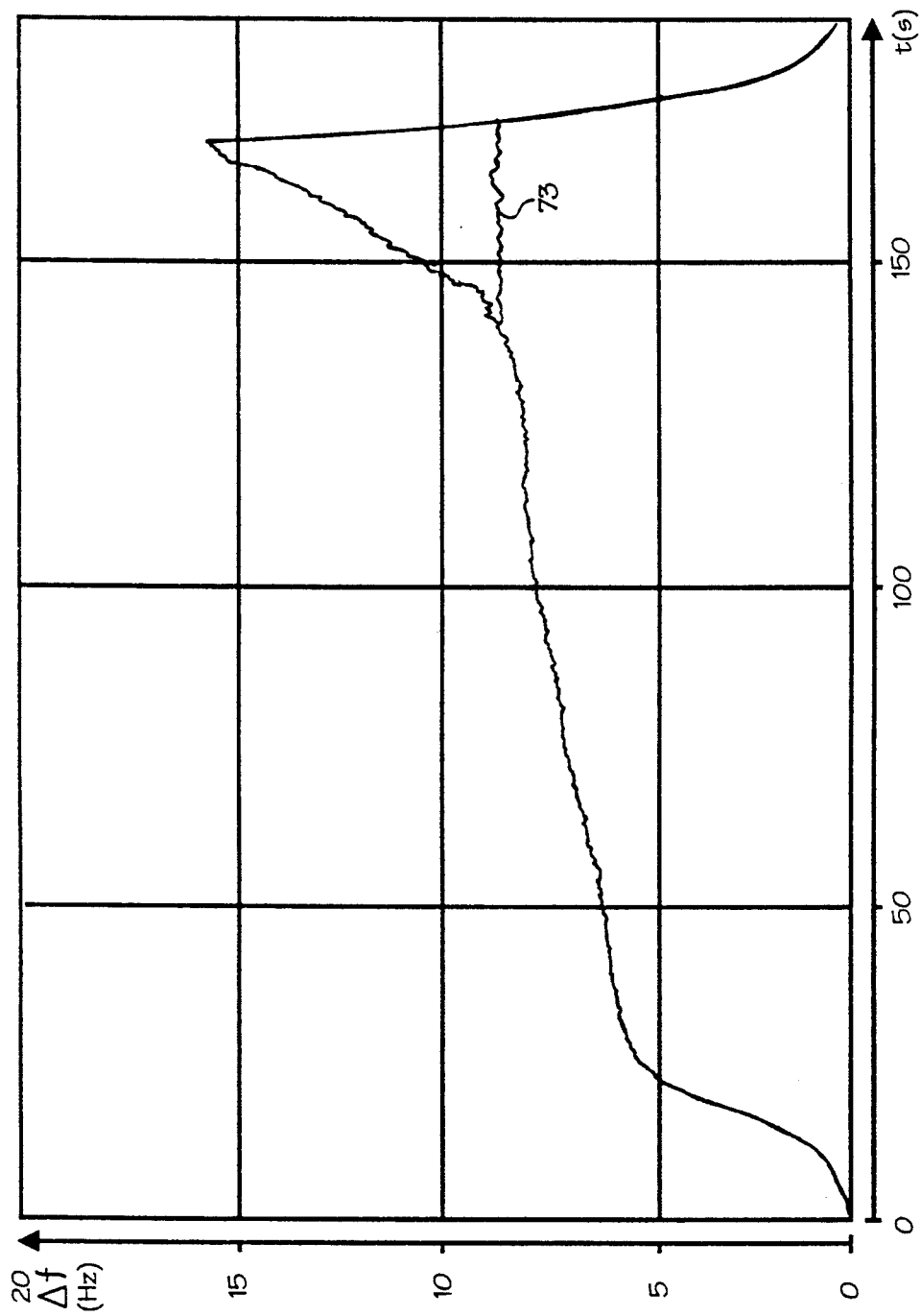
FIG. 13 is a graph of the record of a winding cycle of the winding unit of FIG. 1.

FIG. 13 illustrates the signal path during the rewinding of a yarn delivery bobbin 4 in the form of a cop onto a yarn receiving bobbin 6 in the form of a cross-wound bobbin in a bobbin winder 1 according to FIG. 1. Instead of yarn guide element 21, a yarn guide element according to FIG. 10 was used. Metallized surfaces 67 to 70 of yarn guide element 58 were brought into heat contact with metal parts of the creel. The signal evaluation took place with a circuit according to FIG. 6. A yarn with count 50 Nm which consisted of a fiber mixture of diols and cotton was rewound. The difference frequency delta f in hertz at output A2 of the circuit according to FIG. 6 was recorded, entered over the time t in seconds. After a rapid start, the difference frequency rises slowly. After approximately 140 seconds running time, a sharp rise of the difference frequency occurred until the time at which yarn delivery bobbin 4 had exhausted its yarn supply. This occurs because of a correspondingly rising yarn tension at the same winding speed. Since this rise signals danger for the winding operation, signal converter 16 should engage to control the winding operation when a difference frequency of approximately 9 hertz has been reached. From then on a constant regulating of the difference frequency could be carried out either by the return of the braking action of yarn brake 9 or by returning drive motor 27, as a result of which, the difference frequency delta f would thereafter approximately follow the curve path designated with 73.

After the unwinding of yarn delivery bobbin 4, the time constant of the signal drop to 50% was approximately 2.5 seconds. The drop to room temperature lasted approximately 7 seconds. In the case of a yarn break, a similar sharp signal drop results, which is easily recognized.

During the evaluation, the first derivative of the frequency signal can be automatically formed as a recognition feature for the rise and the start of the intervention in the winding operation. The start, which lasts approximately 2.5 seconds, can be faded out thereby. In the circuit according to FIG. 5, the zero point adjustment of the IC1 is carried out on potentiometer p2. This zero point adjustment could be automated with the goal of readjusting the zero point after every yarn break and after every change of the yarn delivery bobbin. That could take place by the conventional method of an offset circuit per software of a connected computer.

In a further embodiment of the present invention, a second heat sensor, which is in direct or indirect electric operative connection with the first heat sensor, is arranged in such a manner that it determines the ambient temperature or its change over time. The heat flow flowing from the first to the second sensor is determined in the signal converter or in a computer connected downstream from the sensed data of the two sensors and the heat flow is converted to control signals for the operation of the textile machine or its bobbin winder.

The heat flow density is defined as that heat energy which passes per unit of time and unit of area from the first sensor to the second sensor. In order to determine the heat flow density, it is advantageous if, in a further aspect of the present invention, the second heat sensor is located on the side of the first heat sensor that faces away from the heat source. Both heat sensors can be preferably attached to the same holding plate or to the same structural component contacted by the running yarn with sliding friction or applied directly.

The sensors may be vaporized onto thin, self-adhesive foils which lie above one another or are applied adjacent to each other onto their carrier. At least one of the heat sensors can be applied with advantage onto an electrically non-conductive, additional carrier and the additional carrier(s) can be applied with the heat sensor(s) onto, against or in the component contacted by the yarn.

It is recommended to make the sensing film of the heat sensor as thin as possible and to bring it as close as possible to the yarn. The ceramic materials serving as carriers of the sensors and as yarn guide elements should have as high a heat conductivity as possible. In addition to aluminum oxide, other ceramic materials with a higher heat conductivity can also be used, such as e.g. titanium oxide or beryllium oxide. However, such substances have the drawback of being considerably more expensive than aluminum oxide.

It is sufficient for the compensation of room temperature to detect the temperature difference signal of two sensors. If both sensors are located close to one another, then one is independent of the ambient temperature. The temperature difference signals can be readily evaluated, especially with respect to the detection of the heat flow, which can vary in time. It is preferable, in order to improve the measurement, that the heat sink be arranged on the side of the heat sensor or be facing away from the heat source, as is provided for in a further development of the invention. The heat sink can consist of, for example, a metallic platelet or of construction parts of the bobbin winder.

In the circuit of FIG. 6, sensor S2 senses the temperature prevailing in the vicinity of sensor S1 so that the bridge sensing circuit can compensate for any residual heat still present in the yarn guide element after a yarn break. Without temperature compensation, a slight parallel shift of the sensing curve results in the next winding process.

Figure 14:
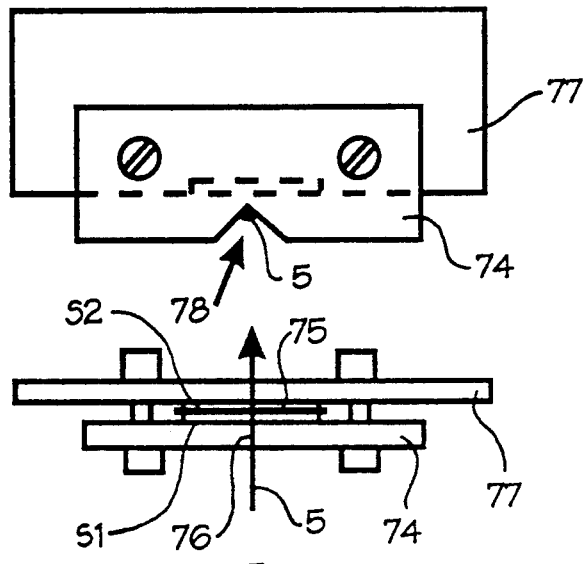
FIG. 14 is a plan view and an elevational view of a modified form of heat sensor.

In the design according to FIG. 14, the two heat sensors S1, S2, which are present in the circuit of FIG. 6, are located on the same holding plate 74. Plate 74 also guides running yarn 5. Heat sensors S1 and S2 sit on both sides of foil 75. Heat sink 77 is located on the side of heat sensor arrangement S1, 75, S2 facing away from heat source 76. Heat sink 77 consists of a copper plate which is attached with the inclusion of heat sensor arrangement S1, 75, S2 to holding plate 74, which is touched by running yarn 5 at heat source 76, that is, in the bottom of notch 78.

A conventional computer present in the textile machine or on its bobbin winder is preferably included in the signal converter, or it is entrusted with partial tasks of the signal converter. The computer can further process temperature signals digitized by the signal converter and it can comprise a suitable control program for controlling the bobbin winder in accordance with the temperature signals. Finally, the computer can also regulate the control devices.

In a further aspect of the present invention, the signal converter or a computer connected downstream is conventionally programmed in such a manner so that it modulates the signal path during frictional temperature or during a temperature difference between two heat sensors and/or of the determined frictional energy and/or of the determined temperature difference and/or of the determined heat flow, and forms the first derivative of the signal path and obtains control signals therefrom for the operation of the textile machine or of the bobbin winder. Provision can be made thereby that the signals and/or their processing are faded out until the yarn is running at a constant speed after the start of a winding process. The signals for this can be obtained by monitoring the winding speed. To this end, the winding speed can be monitored. Such a speed monitoring may be provided by a computer already present in the textile machine, so that its signals could also be used for the fading out.

The transition from the accelerated starting to the yarn travel at a constant speed can also be detected by the path of the frictional temperature or of the temperature difference or by their first derivative or by a change of direction with the object fading out the time period of the starting of the speed.

In a further development of the invention, the signal converter or a computer connected in downstream is conventionally programmed in such a manner that a sudden dropping off of the temperature signal or of the temperature difference signal during a preselected time interval is evaluated as a yarn break signal and as such is passed on to a control device, an announcing device or to a computer of the textile machine. The value of the signal and/or of the first derivative of the signal path over time can be, in a further development of the invention, a preselectable measurement for gaining influence over a control device or a regulating device for the drive motor of a yarn receiving bobbin and/or over a control device or regulating device of a yarn brake located in the path of the yarn. The signal converter or the computer connected downstream is in this instance conventionally programmed for such control.

Since the frictional energy generated by the yarn is also influenced by the yarn speed, in addition to the friction value and the yarn tractive force, a further aspect of the present invention provides that the computer is programmed in a conventional manner so that it maintains the constant quotient, previously mentioned, between the temperature difference and the yarn speed. The frictional heat generated by the lowering of the yarn speed is cleared therewith of the influence factor of the yarn speed. In this manner, a constant yarn tractive or tensile force within settable tolerance limits is achieved.

Figure 15:
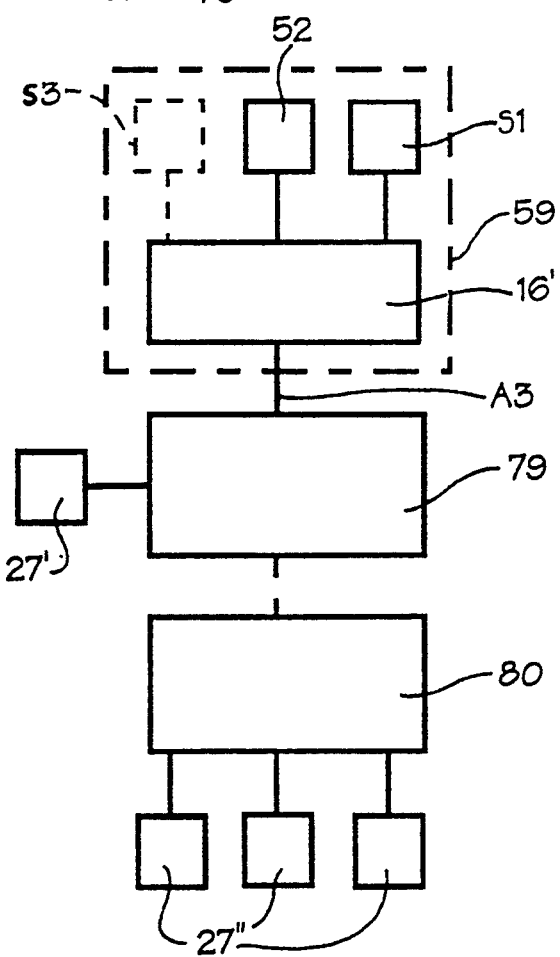
FIG. 15 is a diagrammatic illustration of one mode of connecting various elements of the present invention.

The arrangement of FIG. 15 provides for the locating of signal converter 16', which should contain the circuit of FIG. 6, together with heat sensors S1, S2 on a yarn guide element 59 according to FIG. 11, which is indicated here by a dotted line. Computer 79 is connected to output A3 of signal converter 16', which computer converts in a conventional manner the signals received from A3 into control signals for a connected control device 27', e.g. a speed control device of bobbin winder 1 (FIG. 1), and which computer is programmed conventionally for this purpose.

As an alternative, computer 79 or output A3 can be connected to central computer 80. Several or all signal converters 16' of the bobbin winders of the textile machine can be connected both to computer 79 and also to computer 80. Additionally, control devices 27" for the winding speeds of the individual bobbin winders or other control or regulating devices for the winding operation can be connected to computer 80.

In order to be able to manufacture the platinum resistors suitable here as heat sensors in large piece numbers, the photomasking technique can be used. In this technique the platinum resistor is vaporized in a randomly-shaped fashion onto the foil, so that the determined measurements of length and width of the resistor are assured. The foil is later adhered onto the structural component contacted by the running yarn with sliding friction in such a manner that the metallic sensor directly contacts the substrate.

A second sensor can be applied onto the back side of the foil of the first sensor. The heat sink can then be applied for its part onto the back foil side of the second sensor.

Yet another aspect of the present invention provides that in the textile machine the heat sensor or sensors and the signal converter are located on each bobbin winder or on its winding position, unwinding position, yarn guide position and that the signal converters are connected to a central computer which for its part is connected at least to selected control or regulating devices for the individual work positions o bobbin winders. The heat sensor and its signal converter may be used selectively for yarn tensioning control, for yarn tensioning regulation or for yarn type recognition. The yarn break detector of the present invention is particularly suited for use in bobbin winders or in quillers which are located in spinning machines, winding machines, warping devices and beaming devices, twisters, texturing machines or the like or on creels.

Since the development of the frictional heat also change as the friction value changes, it is possible with this invention to determine by the monitoring of the temperature whether the correct yarn is being processed or whether, which occurs in rare instances and then has unforeseeable consequences, a yarn delivery bobbin was presented with the false yarn.

Since the detection that frictional heat exhibits a greater or lesser response inertia, depending on the type of sensor and on its arrangement, it is excluded that signal jumps and therewith undesired overreactions can be initiated if only brief, non-damaging heat jumps occur at the point of friction.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. Means for controlling the travel of yarn in a textile machine, comprising:
    means for winding yarn from a yarn delivery bobbin onto a receiving bobbin, including means for causing the yarn to travel in a travel path between the two bobbins;
    a heat sensor disposed for direct contact with the yarn during travel of the yarn in the yarn travel path between the two bobbins; and
    means for selectively increasing or decreasing the tension of the yarn in response to the temperature thereof sensed by the heat sensor.

2. Means for controlling the travel of a yarn in a textile machine according to claim 1 wherein said heat sensor includes means for monitoring at lest one of the pressure force, friction value and speed of the traveling yarn relative to said heat sensor.

3. Means for controlling the travel of a yarn in a textile machine according to claim 1 wherein said heat sensor includes means for detecting at least one of the following:
friction temperature, change over time of friction temperature, frictional energy and heat flow.

4. Means for controlling the travel of a yarn in a textile machine according to claim 1 wherein said heat sensor is a temperature-sensitive electric resistor.

5. Means for controlling the travel of a yarn in a textile machine according to claim 4 wherein said electric resistor is one of a thin-layer resistor and a film thermometer.

6. Means for controlling the travel of a yarn in a textile machine according to claim 4 wherein said electric resistor comprises a thin layer comprising at least one of platinum and nickel.

7. Means for controlling the travel of a yarn in a textile machine according to claim 4 wherein said resistor is disposed on a machine component over which the yarn travels in sliding friction contact.

8. Means for controlling the travel of a yarn in a textile machine according to claim 4 wherein said resistor is coated with a mechanically resistant protective layer.

9. Means for controlling the travel of a yarn in a textile machine according to claim 1 wherein said heat sensor is disposed for sliding friction contact by the traveling yarn.

10. Means for controlling the travel of a yarn in a textile machine according to claim 1 wherein said heat sensor is disposed in an aperture formed in a machine component over which the yarn travels in sliding friction contact.

11. Means for controlling the travel of a yarn in a textile machine according to claim 1 further comprising:
an electric insulator on which said at least one heat sensor is mounted and having a metallized surface; and a metallic cooling element disposed at a sensing site and contacting said metallized surface.

12. Means for controlling the travel of a yarn in a textile machine according to claim 1 further comprising:
a signal converter connected to said heat sensor and said means for selectively increasing or decreasing the tension of the yarn, said heat sensor being operative to produce a temperature signal and said signal converter being operative to produce and deliver a corresponding converted signal to said means for selectively increasing or decreasing the tension of the yarn, and said means for selectively increasing or decreasing the tension of the yarn being operative in response to said converted signal.

13. Means for controlling the travel of a yarn in a textile machine according to claim 12 and further comprising a yarn receiving bobbin, a controllable drive motor for the yarn receiving bobbin, ad a controllable yarn brake.

14. Means for controlling the travel of a yarn in a textile machine according to claim 13 wherein said signal converter comprises a control circuit for the controlling of said yarn brake in correspondence with rising heat sensed and for the controlling of said drive motor with a reduction in the braking action of said yarn brake.

15. Means for controlling the travel of a yarn in a textile machine according to claim 12 wherein said signal converter comprises at least one of an electronic amplifier circuit and a bridge circuit.

16. Means for controlling the travel of a yarn in a textile machine according to claim 12 wherein said signal converter further comprises a temperature compensation sensor.

17. Means for controlling the travel of a yarn in a textile machine according to claim 12 further comprising a computer connected to said signal converter for processing said converted signal.

18. Means for controlling the travel of a yarn in a textile machine according to claim 12 wherein said signal converter comprises:
a temperature offset circuit which sets a temperature zero point upon the start of each yarn travel operation following the occurrence of at least one of a yarn break and the end of a supply of yarn to the machine.

19. Means for controlling the travel of a yarn in a textile machine according to claim 12 wherein said signal converter comprises a voltage-to-frequency converter which converts temperature signals into frequency signals.

20. Means for controlling the travel of a yarn in a textile machine according to claim 12 wherein said signal converter has components and at least some of said components are disposed in a common housing disposed in the vicinity of said heat sensor.

21. Means for controlling the travel of a yarn in a textile machine according to claim 20 wherein said common housing consists of a material which is a heat conductor and an electric insulator.

22. Means for controlling the travel of a yarn in a textile machine according to claim 12 wherein said signal converter includes modulation means for modulating a signal from said heat sensor.

23. Means for controlling the travel of a yarn in a textile machine according to claim 22 wherein said modulation means is operable to modulate at lest one of a frictional temperature signal, a temperature deference signal between said first and second heat sensors, and a heat flow signal, and wherein said means for selectively increasing or decreasing the tension of the yarn is operative to produce at least one control signal from said modulate signal.

24. Means for controlling the travel of a yarn in a textile machine according to claim 23, wherein said at least one control signal controls operation of at least one of a drive motor for causing the yarn to travel in the machine and a yarn brake; and wherein at least one of said signal converter and a computer provides said control signal.

25. Means for controlling the travel of a yarn in a textile machine according to claim 24, wherein at least one of said signal converter and said computer includes means for receiving said modulated signal for the control of at least one of said drive motor and said yarn brake.

26. Means for controlling the travel of a yarn in a textile machine according to claim 25, wherein at least one of said signal converter and said computer includes means for forming a quotient between said temperature difference and a yarn speed generated by said drive motor and for maintaining said quotient constant by controlling at least one of said drive motor and said yarn brake.

27. Means for controlling the travel of a yarn in a textile machine according to claim 12 wherein said heat sensor and said signal converter comprise means for at least one of yarn tensioning control, yarn tensioning regulation and yarn type recognition.

28. Means for controlling the travel of a yarn in a textile machine according to claim 1 and further comprising a second heat sensor electrically connected to said first-mentioned heat sensor for sensing at least one of an ambient temperature, an ambient temperature change over time, and heat flow from said first sensor to said second sensor and for producing at least one temperature signal; and said means for selectively increasing or decreasing the tension of the yarn includes means for converting said at least one temperature signal to at least one control signal for the operation of the textile machine.

29. Means for controlling the travel of a yarn in a textile machine according to claim 28 wherein said means for selectively increasing or decreasing the tension of the yarn comprises at least one of a signal converter and a computer for converting said at least one-temperature signal to said at least one control signal.

30. Means for controlling the travel of a yarn in a textile machine according to claim 28 wherein said second heat sensor is spaced from said first heat sensor.

31. Means for controlling the travel of a yarn in a textile machine according to claim 28 wherein said first and said second heat sensors are disposed for sliding friction contact by the traveling yarn.

32. Means for controlling the travel of a yarn in a textile machine according to claim 28 wherein at least one of said first ad second sensors is formed on an electrically non-conductive member in contact with a member in contact with said traveling yarn.

33. Means for controlling the travel of a yarn in a textile machine according to claim 28 further comprising a heat sink arranged in contact with said second heat sensor.

34. Means for controlling the travel of a yarn in a textile machine according to claim 28, characterized in that the textile machine is a winder having a winding station, an unwinding station, a yarn brake, and a yarn guide, and said first and said second heat sensors and a single converter are disposed proximate on one of said winding station, said unwinding station, and said yarn guide, and that said signal converter is connected to a computer which is connected to at least one of a selected control and a regulating device of said yarn brake located in the path of said yarn.

35. Means for controlling the travel of a yarn in a textile machine according to claim 1 further comprising a heat sink arranged in contact with said at least one heat sensor.

36. Means according to claim 1 wherein the means for selectively increasing or decreasing the yarn tension includes means for selectively applying a compressive force to the yarn as it travels between the two bobbins.

37. Means according to claim 1 wherein the means for selectively increasing or decreasing the tension of the yarn includes means for increasing or decreasing the speed of travel of the yarn between the two bobbins.

38. Means according to claim 1 and further comprising a second heat sensor for sensing the ambient temperature, the means for selectively increasing or decreasing the tension of the yarn including means for selectively increasing or decreasing the tension of the yarn in response to fluctuations in the difference between the temperatures detected by the first-mentioned heat sensor and the second heat sensor.

39. A method for controlling the travel of yarn in a textile machine, comprising:
  winding yarn from a yarn delivery bobbin onto a receiving bobbin, the yarn traveling in a travel path between the two bobbins;
  traveling the yarn in direct contact with a heat sensor during travel of the yarn in the yarn travel path between the two bobbins; and
  selectively increasing or decreasing the tension of the yarn in response to the temperature thereof sensed by the heat sensor.

40. Method according to claim 39 wherein the step of selectively increasing or decreasing the yarn tension includes selectively applying a compressive force to the yarn as it travels between the two bobbins.

41. Method according to claim 39 wherein the step of selectively increasing or decreasing the tension of the yarn includes increasing or decreasing the speed of travel of the yarn between the two bobbins.

42. Method according to claim 39 and further comprising a second heat sensor to sense the ambient temperature and the step of selectively increasing or decreasing the tension of the yarn includes selectively increasing or decreasing the tension of the yarn in response to fluctuations int e difference between the temperature detected by the first-mentioned heat sensor and the second heat sensor.

* * * * *